United States Patent [19]
Carroll

[11] 3,824,891
[45] July 23, 1974

[54] MACHINE TOOL
[75] Inventor: Richard R. Carroll, Chagrin Falls, Ohio
[73] Assignee: Litton Industrial Products, Inc., Cleveland, Ohio
[22] Filed: May 11, 1973
[21] Appl. No.: 359,527

[52] U.S. Cl.................... 90/11 A, 29/26 A, 29/568, 318/39, 318/657
[51] Int. Cl............................................ B23b 47/06
[58] Field of Search............ 90/11 R, 11 A; 29/26 A, 29/568; 318/657, 627, 39

[56] References Cited
UNITED STATES PATENTS

| | | | |
|---|---|---|---|
| 3,219,896 | 11/1965 | Zilber.............................. | 318/657 |
| 3,520,228 | 7/1970 | Wohlfeil........................... | 90/11 A |
| 3,587,359 | 6/1971 | McCash............................. | 29/568 X |
| 3,709,623 | 1/1973 | Stephan, deceased et al. .. | 29/568 X |

*Primary Examiner*—Andrew R. Juhasz
*Assistant Examiner*—Z. R. Bilinsky
*Attorney, Agent, or Firm*—Spencer T. Smith

[57] ABSTRACT

A machine tool comprising a rotatable spindle including first and second continuous track surfaces, means for reducing the speed of rotation of the spindle to at least a predetemined maximum speed, a linear variable differential transformer including, probe means advanceable from a retracted position to an advanced position where the probe means selectively engages the first and second track surfaces, means for biasing the probe means against the first and second track surfaces when the probe means is at the advanced position, and means for generating an output signal having one phase when the probe means engages one of the track surfaces and having a second phase when the probe means engages the other one of the track surfaces, reversible motor means for driving the spindle, signal conditioner means for receiving the output signal from the linear variable differential transformer and for directing a signal to the reversible motor to drive the reversible motor in a first direction when the output signal from the linear variable differential transformer has one phase and for directing a signal to the reversible motor to drive the reversible motor in a second direction when the output signal from the linear variable differential transformer has the second phase.

8 Claims, 4 Drawing Figures

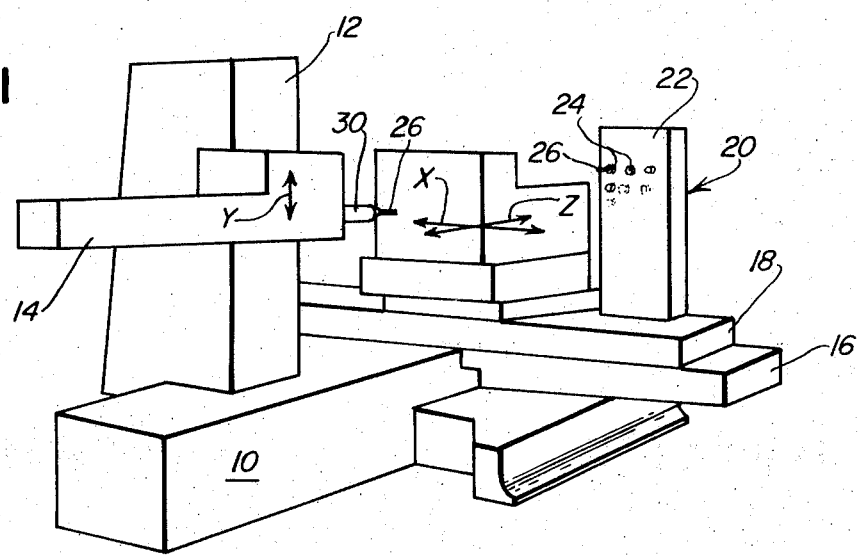
Fig_1
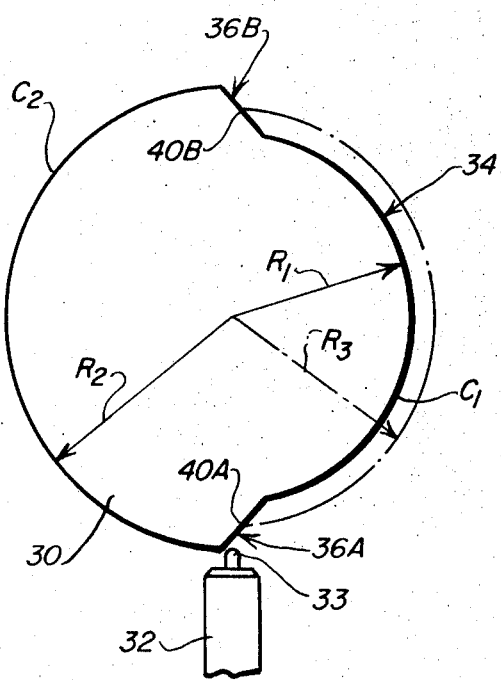
Fig_3
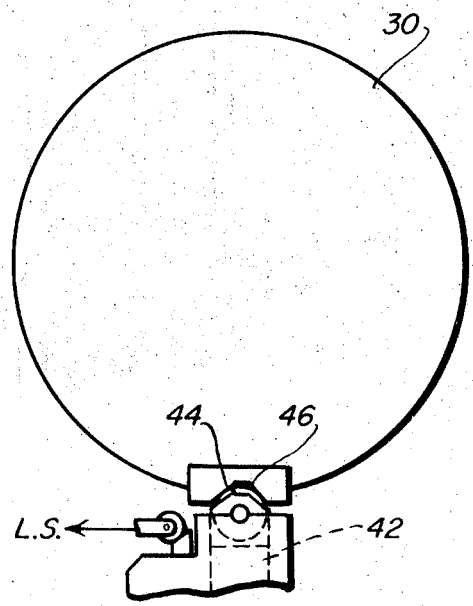
Fig_4

MACHINE TOOL

In conventional combined boring, drilling and milling machines of the type disclosed in U.S. Pat. No. 3,709,623, the rotation of the machine spindle is always stopped with the spindle at a predetermined angular orientation so that tools may be automatically transferred to or from the spindle. In such machines the spindle speed is reduced to substantially zero at the conclusion of a machining operation and the spindle is rotated at a constant slow speed until the spindle has a predetermined angular orientation. A first proximity switch is then closed and the spindle drive motor is de-energized. The spindle rotation is accordingly halted. If the spindle is stopped within a predetermined angular range, a plunger actuated roller will be forced into a V-shaped groove defined on the periphery of the spindle and the spindle will be positively locked at a precise predetermined orientation. In the event that the spindle is not stopped within the predetermined angular range or window, a second proximity switch will be closed to again energize the spindle drive motor to rotate the spindle until the first proximity switch is again closed.

In such prior art systems, substantial time elapses from the conclusion of the machining operation to the actuation of the plunger and this is undesirable.

Precise spindle orientation is also required in many other machining operations such as single point threading or boring.

Accordingly, it is an object of the present invention to provide a mechanism for quickly stopping the spindle at a predetermined angular orientation.

Among the advantages of the present invention is the provision of a mechanism for stopping the rotation of a rotating spindle at a predetermined angular orientation which will have an extremely high accuracy.

Other objects and advantages of the present invention will become apparent from the following portion of this specification and from the accompanying drawings which illustrate, in accordance with the mandate of the patent statutes, a presently preferred embodiment incorporating the teachings of the present invention.

Referring to the drawings:

FIG. 1 is an oblique elevational view of a combined boring, drilling and milling machine;

FIG. 3 is a cross-sectional view of the spindle illustrated in FIG. 1 taken at a first axial location; and FIG. 4 is a cross-sectional view of the spindle illustrated in FIG. 1 taken at a second axial location.

Figure 2:
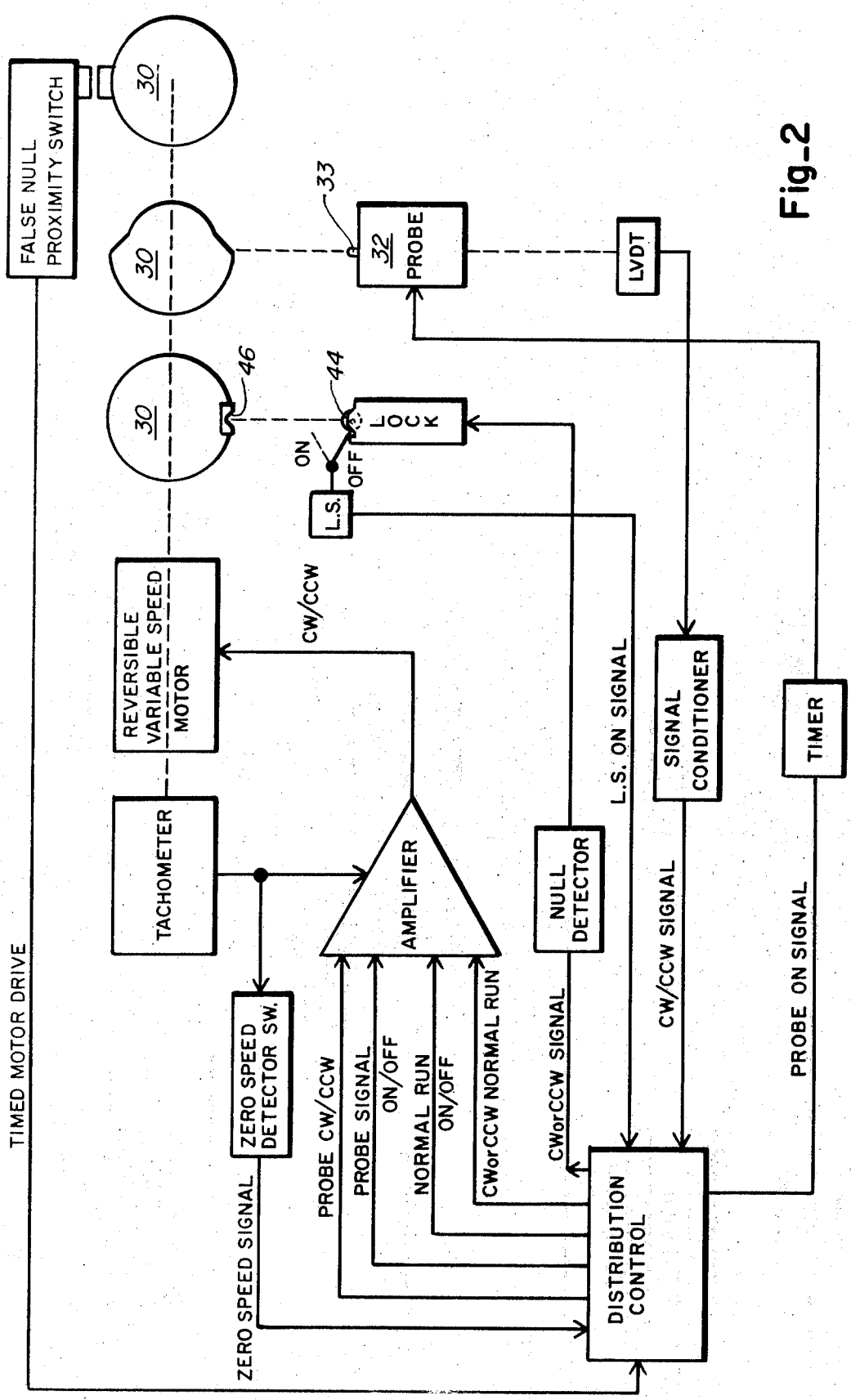
FIG. 2 is a schematic diagram illustrating the spindle orientation system for the machine illustrated in FIG. 1.

A combined boring, drilling and milling machine is illustrated in FIG. 1. Such a machine includes a bed or base 10, a column 12 on which a spindle head or slide member 14 is mounted for vertical displacement in the Y-direction, a saddle or slide member 16 supported on the upper side of the bed 10 for movement towards and away from the column 12 in the (Z) direction and a work table or work carrying slide member 18 supported on the top of the saddle 16 for movement transversely of the bed in the (X) direction.

A tool rack 20 is mounted on the upper right-hand front corner of the work table 18 and includes a tool magazine 22 having a plurality of tool holding pots 24 in which tools 26 are maintained with the keys thereof (not shown) maintained at a predetermined angular orientation.

When the rotation of the slide member spindle 30 is stopped with the keyway thereof (not shown) in a predetermined angular orientation, selected tools can be directly or indirectly transferred from the spindle to the tool magazine and returned from the tool magazine to the spindle by conventional automatic means. Reference may be had to U.S. Pat. No. 3,709,623 for specific details of the combined boring, drilling and milling machine illustrated in FIG. 1.

When a machining operation has been completed, an "OFF" signal is generated by a distribution control (FIG. 2) and is directed to a reversible variable speed motor which may preferably be the main spindle drive motor. The rotation of the spindle 30 is then braked in a conventional manner such as by regeneration. When the spindle speed, which is sensed by a tachometer is reduced to a predetermined maximum speed, (preferably approximately zero), the voltage produced by a voltage sensitive relay (zero speed detector switch) decreases below a predetermined threshold level and an "OFF" signal is removed from the reversible variable speed spindle motor and an "ON" signal is directed from the distribution control to a probe control or drive 32 (an air actuated spring return gage head), which advances the probe 33 thereof from a retracted position to an advanced position where it is biased to follow a selectively configured cam surface 34 (FIG. 3) on the spindle 30. The cam surface includes two cylindrical, coaxial portions $C_1$, $C_2$ which have substantially different radii $R_1$, $R_2$, and diametrically opposite substantially linear planar surfaces 36A, 36B which substantially smoothly connect the cylindrical portions.

The probe control 32 is connected to a linear variable differential transformer which is indicated in the drawings as (LVDT) and which is selectively designed so that when the probe is at a NULL point 40A, 40B (radius $R_3$) on either of the linear planar surfaces, the linear variable differential transformer will be nulled. An output signal of a given phase will accordingly be generated whenever the probe lies on a first track which extends in one direction from one of the null points 40A to the other null point 40B, and an output signal having a different phase will be generated whenever the probe lies on a second track which extends in the opposite direction from the one null point 40A to the other null point 40B.

The output signal from the linear variable differential transformer is passed through a signal conditioner which may include a servo amplifier and a signal conditioner output signal is directed conjointly to a null detector and to the reversible motor which rotates in either of two modes (clockwise or counterclockwise) determined by the phase of the output signal of the linear variable differential transformer and at a speed determined by the magnitude of the signal which is dependent upon the radial distance of the probe from the null point.

The reversible motor, accordingly, will rotate the spindle in one direction when the probe engages the first track and will rotate the spindle in an opposite direction when the probe engages the other track.

When the signal conditioner is nulled, the reversible motor will be deenergized and the rotation of the spindle will accordingly be terminated. The null detector switch will sense the nulled condition of the signal conditioner (preferably by a voltage sensitive relay) and the null detector switch signals a spindle lock (FIG. 4) in the form of a hydraulically actuated plunger 42 having a rotatable cylinder 44 at the end thereof to operate. If the probe 33 nulls the linear variable differential transformer at the correct null position 40A, the plunger 42 will be advanced into a V-shaped notch 46 on the spindle periphery to positively lock the stopped spindle at a precise predetermined orientation. In that event, a limit switch (LS) will be closed and a signal will be directed to the distribution control to indicate that the spindle has been properly locked at the prede-, termined orientation.

If the probe is situated proximate the incorrect null location 40B, the plunger will not be completely advanced into the V-shaped notch, and the limit switch will not be closed. In that event, a false null proximity switch carried by a separate spindle cam will close and a signal will appear at the distribution control momentarily energizing the reversible motor to displace the probe from the false NULL position. The linear variable differential transformer will again function until the spindle is properly locked by the plunger mechanism in the manner above described.

It can be appreciated that the speed of the reversible motor as the probe follows the two tracks, will vary directly with the radial distance from the null point ($R_2 - R_3$) when the probe is engaging cylindrical portion $C_2$). The reversible motor may accordingly be run at a high speed while the probe engages the coaxial cylindrical portions $C_1$, $C_2$ and may be decelerated as desired by varying the length (slope) of the linear planar surfaces.

Having thus disclosed the invention, what is claimed is:

1. A machine tool comprising
    a rotatable element including first and second continuous track surfaces,
    means for reducing the speed of rotation of said element to at least a predetermined maximum speed, probe means advanceable from a retracted position to an advanced position where said probe means selectively engages said first and second continuous track surfaces, said advanced probe being adapted to follow said first and second continuous track surfaces when said element rotates,
    a linear variable differential transformer including,
    means for generating an output signal having one phase when said probe means engages one of said track surfaces and having a second phase when said probe means engages the other one of said track surfaces,
    means for advancing said probe means from said retracted position to said advanced position when the speed of rotation of said element is reduced to said predetermined maximum speed,
    reversible motor means for driving said element, and
    signal conditioner means for receiving the output signal from said linear variable differential transformer and for directing a signal to said reversible motor to drive said motor in a first direction when the output signal from said linear variable differential transformer has said one phase and for directing a signal to said reversible motor to drive said motor in a second direction when the output signal from said linear variable differential transformer has said second phase.

2. A machine tool according to claim 1, wherein each of said tracks includes a cylindrical portion and said cylindrical portions are coaxial.

3. A machine tool according to claim 2 further comprising sloping portions for joining said coaxial cylindrical portions, said probe being selectively located so that said linear variable differential transformer will be nulled when said probe engages said sloping portions at predetermined points.

4. A machine tool according to claim 3, wherein the radii of said coaxial cylindrical portions are selected to enable said reversible motor to be driven at a predetermined speed.

5. A machine tool according to claim 4, wherein the slope of said sloping portions is selected so that the reversible motor will be decelerated at a predetermined rate.

6. A machine tool according to claim 5 further comprising means for locking said element when said element stops at a predetermined orientation whereat said probe means engages a selected one of said sloping portions at the null point thereof.

7. A machine tool according to claim 6 further comprising means for engaging said reversible motor in the event that said element stops at a predetermined orientation whereat said probe means engages the other one of said sloping portions at the null point thereof.

8. A machine tool according to claim 6, wherein said predetermined maximum speed is substantially zero.

* * * * *